J. H. HALL.
ELECTRIC CONTROLLER.
APPLICATION FILED APR. 25, 1911.
1,053,496.
Patented Feb. 18, 1913.
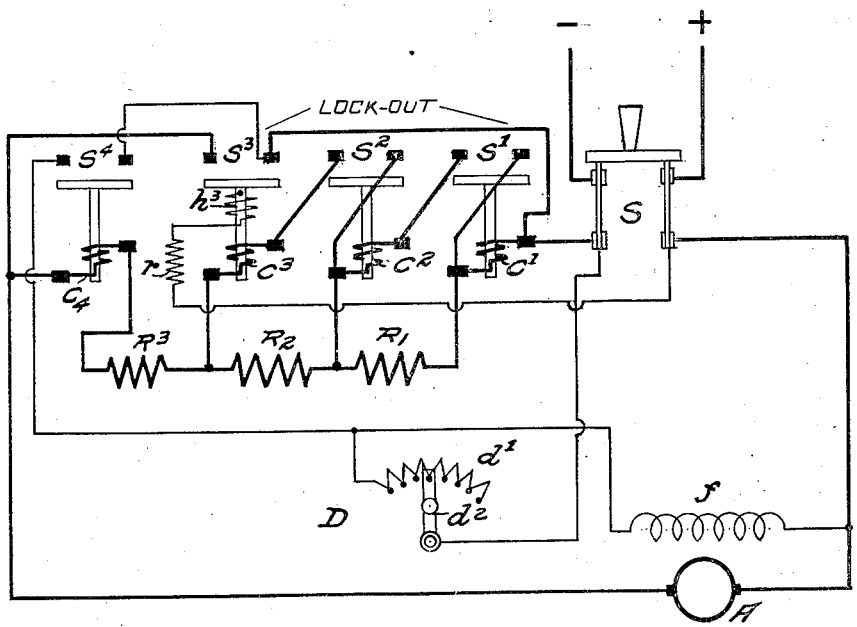
WITNESSES
INVENTOR
Jay H. Hall
BY
ATTORNEY

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

ELECTRIC CONTROLLER.

1,053,496.  Specification of Letters Patent.  Patented Feb. 18, 1913.

Application filed April 25, 1911. Serial No. 623,213.

*To all whom it may concern:*

Be it known that I, JAY H. HALL, a citizen of the United States, residing at Cleveland, in the county of Cuyahoga and State of Ohio, have invented new and useful Improvements in Electric Controllers, of which the following is a specification.

My invention relates to improvements in electric controllers, and particularly that type which is used to control motors with shunt field windings and in which a field regulator is used in connection with the shunt field to control the speed of the motor. During the starting of such a motor it is desirable that the regulator be cut out of circuit while the motor is being accelerated in order that the field strength will be great enough to prevent arcing at the motor brushes, and to develop sufficient torque to start the load.

I have shown my invention used in connection with magnetically operated switches whose operating windings are energized by current in the motor circuit, and it is desirable upon the closure of the last resistance controlling switch to hold this switch closed by means of a winding connected in shunt across the source of supply in order to prevent the opening of this switch should the motor current become zero or reversed. This often happens with motors driving line shafts or a load having a fly-wheel effect wherein the fly-wheel will tend to drive the motor upon a sudden reduction of voltage on the line, thereby producing a negative current through the motor, which would cause the resistance controlling switch to drop out if its winding depended upon the motor current to hold it closed.

The objects of my invention are (1) to provide a controller which will insure that the motor will be accelerated under full field excitation; (2) to maintain such excitation during the whole period of acceleration; and (3) to provide a means for holding the last resistance controlling switch closed irrespective of the amount of current flowing in the armature circuit.

To further describe my invention I will refer to the accompanying drawing which shows a wiring diagram of a motor controller embodying my invention.

In this drawing I show a knife switch S for connecting the motor and controller to a source of supply. The armature of the motor is represented by A, the shunt field by $f$, the starting resistance by $R'$, $R^2$, $R^3$, resistance controlling switches $S'$, $S^2$, $S^3$ having the windings $C'$, $C^2$, $C^3$, respectively. The shunt field regulator is shown at D, and a relay is shown at $S^4$ having a winding $C^4$ which operates to short-circuit the resistance of the regulator whenever its operating winding is energized.

The resistance controlling switches $S'$, $S^2$, $S^3$ are of the type described in Canfield's applications, Serial Number 583,000, filed September 21, 1910, and Serial Number 604,331, filed January 23, 1911, and in Eastwood's Patent, No. 1,040,292, granted October 8, 1912. In these applications and in this patent, particularly in Figure 2, the switches have the peculiar characteristic that they remain in their open position when their operating windings are energized above a predetermined value, and will operate to close their contacts when the energization falls below this value. On the last resistance controlling switch $S^3$ is a holding winding $h^3$, the lower end of which is connected directly to the positive side of the switch S through a limiting resistance $r$. The upper terminal of the winding $h^3$ is electrically connected to the piece which bridges the main contacts of the switch $S^3$. Since one of these contacts is connected directly with the negative side of the switch S, the winding $h^3$ will be energized upon closure of the switch $S^3$ and will hold the switch closed until deënergized by the opening of the switch S. Since the switch $S^3$ requires only a small amount of energization to hold it closed, the winding $h^3$ could be connected permanently across the terminals of the switch S, if so desired. In this event, the winding $h^3$ could be connected in the circuit of the shunt field $f$. The objection to this method, however, is a commercial one, since different makes of motors of the same size have different amounts of current for exciting the series field, which would necessitate a different design for the holding winding $h^3$ for each make and size of motor. I, therefore, prefer to connect the winding $h^3$ as shown in the drawing.

The relay $S^4$ has its operating winding in the motor circuit during acceleration only. This relay does not have the locking-out feature of the resistance controlling switches, but will close immediately upon the energization of its winding when the switch S is closed.

The regulator D has a contact at $d^2$ arranged to sweep over a series of contacts connected to the field resistance $d'$, so that any desired amount of this resistance can be placed in the shunt field circuit for regulating the speed of the motor.

The operation of the controller is as follows: Upon the closure of the switch S a circuit is established from the positive line through the armature A, the winding $C^4$ of the relay $S^4$, the starting resistance $R'$, $R^2$, $R^3$, and the operating winding $C'$ of the switch $S'$ to the negative. This causes the relay to immediately close its contacts and a circuit is established from the positive line through the shunt field $f$, and the contacts of the relay $S^4$ to the negative line. This allows the motor to start under full field excitation. The starting current which is limited by the resistance $R'$, $R^2$, $R^3$, allows sufficient current to flow to start the motor, this value of current being such that the switch $S'$ will be locked open. As the motor speeds up the armature current gradually diminishes and when it reaches the value at which the switch $S'$ is adjusted to operate it will close its contacts, short-circuit the resistance section $R'$, and cause the winding $C^2$ of the switch $S^2$ to become energized. The increase of current in the armature circuit caused by the short-circuiting of the resistance $R'$ will lock open the switch $S^2$, and as the motor further increases in speed, the current will again diminish until it reaches the value at which the switch $S^2$ is adjusted to operate, at which time it will close its contacts, short-circuit the resistance section $R^2$, and connect in circuit the winding $C^3$ of the switch $S^3$. The armature current again increases and the switch $S^3$ is locked open. When the current again diminishes to the value at which this switch is adjusted to operate, it will close its contacts, and, in so doing, will energize the winding $h^3$, as previously described, which will hold the switch $S^3$ closed. The closure of this switch short-circuits the starting resistance section $R^3$ and connects the motor armature directly across the line by a circuit which is easily traced and which does not include any of the windings $C'$, $C^2$, $C^3$, and $C^4$. The switches $S'$ and $S^2$ immediately drop open, the switch $S^3$ remaining closed by virtue of its holding winding $h^3$. The relay $S^4$ is now free to drop open, and will do so as soon as the magnetism of the magnetic circuit dies out sufficiently to allow it, it being desirable for a short interval of time to elapse after the closure of the switch $S^3$ before the relay drops open and inserts the resistance $d'$ or that portion of it which will be inserted in the shunt field circuit, depending upon the position of the arm $d^2$. The magnetic circuit of the relay $S^4$ can be so designed that it will require several seconds after the deënergization of the winding $C^4$ before the relay will drop open. This will allow the armature current which has increased due to the short-circuiting of the resistance section $R^3$ to diminish before the shunt field is weakened by the introduction of the regulator resistance. After the relay $S^4$ has opened, the circuit through the shunt field is from the positive line through the field winding $f$, through the portion of the resistance $d'$ to the left of the contact on which the arm $d^2$ rests, and through the arm $d^2$ to the negative line. It is thus seen that the motor will always be started under full field excitation, that this condition of the field will continue throughout the acceleration of the motor, and that the regulator will then be automatically connected in, the resultant speed of the motor being that determined by the adjustment of the regulator.

The usual method of starting the motor is to move the field regulator to the full field position before starting, and then bring the motor up to the desired speed by adjusting the regulator. It often occurs that the operator will fail to do this, and my invention insures that the motor will always be started under proper field excitation.

It will be readily understood by those skilled in the art that the knife switch S can be replaced by any combination of switches forming a main switch, one or more of which can be magnetically operated, or a reverser for the motor can be used for the purpose. The controller can also be used in connection with a compound-wound motor.

I have shown my invention used in connection with switches operated by the motor current, but it will be also readily understood that it can be used with other forms of switch or controller for starting the motor, using shunt-field regulation.

I claim—

1. In an electric motor system, a motor, a circuit therefor containing a resistance, one or more switches for controlling said resistance, a field regulator for the motor, and a switch for shunting said regulator, and an operating winding for the last named switch energized by the motor current so long as the said resistance is in circuit.

2. In an electric motor system, a motor, a resistance, means for starting said motor by first connecting it to a source of supply in series with the resistance and then gradually cutting out said resistance, a field regulator for the motor, a magnetically operated switch for shunting said regulator while the motor is being started, and means for shunting the winding of the said switch whenever all the resistance is cut out.

3. In an electric motor system, a motor, a circuit therefor, a series of resistance sections for controlling said circuit, a series of magnetically operated resistance switches for controlling said sections, a shunt field regulator for the motor, a main switch connecting said motor and controller to a source of supply, a relay, energized by the motor current when said main switch is closed, for shunting said regulator, and means controlled by the last of the resistance switches for shunting the energizing winding of said relay.

4. In an electric controller, a circuit, a rheostatic resistance for said circuit, a second circuit, a regulator therefor, a switch for shunting said regulator, and an energizing winding for the switch connected in the first circuit and energized only when said resistance is in the circuit.

5. In an electric controller, a circuit, a rheostatic resistance for the circuit, one or more switches having contacts in the circuit for controlling the resistance, a second circuit, a regulator therefor, a relay for shunting said regulator, an energizing winding for the relay in the first circuit, and means for shunting the winding of the relay.

6. In an electric controller, a circuit, a rheostatic resistance in the circuit, a second circuit, a controlling device therefor, a switch for controlling the said device, an operating winding for the switch energized by current through said resistance, and means for cutting the resistance out of circuit.

7. In an electric motor system, a motor, a resistance, a magnetically-operated switch for said resistance having its operating winding in the motor circuit, a shunt field regulator for the motor, and a relay for shunting the regulator having its winding in the motor circuit, the relay winding being shunted when the switch has closed to cut out the resistance.

8. In an electric motor system, a motor, a shunt field winding therefor, a regulator for the winding, means for starting the motor with the field winding fully excited, and a switch controlled by the current in the motor circuit for causing the regulator to become operative after the motor has reached a certain speed.

9. In an electric motor system, a motor, a field winding therefor, a regulator for said winding, means for starting the motor, and a switch controlled by the current in the motor circuit during the acceleration of the motor for causing said regulator to become inoperative.

10. In an electric motor system, a motor, a field winding therefor, a regulator for said winding, and means controlled by the current in the motor circuit during the acceleration of the motor for starting the motor under full field excitation and for causing the regulator to become operative.

11. In an electric controller, a circuit, a series of resistance sections therein, a series of switches adapted to close in a predetermined order to control the sections of resistance, operating windings for the switches connected in the circuit, a shunt winding on the last switch of the series for holding it closed, and means controlled by the last switch for shunting its operating winding.

12. A circuit, a resistance, a pair of contacts for controlling the resistance, an energizing winding in the circuit for closing said contacts, a second circuit, a holding winding for the contacts energized by the second circuit, and means including the contacts for energizing the holding winding when the switch is closed.

13. A circuit, a resistance, a pair of contacts for controlling the resistance, an energizing winding in the circuit for closing said contacts, a second circuit, a holding winding energized by the second circuit, and means including the contacts for shunting the operating winding.

14. A circuit, a resistance, a pair of contacts for controlling the resistance, an energizing winding in the circuit for closing the contacts, a second circuit, a holding winding energized by the second circuit, and means including the contacts for energizing the holding winding and shunting the operating winding when the switch is closed.

15. A circuit, a resistance, a pair of stationary contacts for controlling the resistance, a movable member for bridging the contacts, an energizing winding for closing the bridging piece on said contacts, a second circuit, and a winding for holding the bridging piece on said contacts energized by the second circuit and connected to the bridging piece.

16. In an electric controller, a circuit, a rheostatic resistance therefor, one or more magnetically-operated switches for controlling the resistance, each having an operating winding in the circuit, a second circuit, a holding winding on at least one of said switches energized by the second circuit, and means controlled by the last-mentioned switch for shunting its operating winding.

17. In an electric motor system, a motor, a circuit therefor containing a rheostatic resistance, a series of switches for controlling the resistance adapted to close in a predetermined sequence, each having its operating winding in the circuit, a second circuit, a holding winding on the last switch of the series energized by the last circuit, and means for energizing said holding winding when the said last switch closes.

18. In an electric motor system, a motor, a circuit therefor containing a rheostatic resistance, a series of switches for controlling the resistance, at least one of the switches having an operating winding energized by the motor current, a shunt holding-winding for the switch, and means for energizing the holding winding and shunting the operating winding when the switch is closed.

19. A circuit, a series of resistance sections therein, a series of switches adapted to close in a predetermined order to control the sections of resistance, operating windings for the switches connected in the circuit, and a shunt winding on the last switch of the series for holding it closed.

20. In an electric controller, a circuit, a series of switch contacts in the circuit, an actuating winding for each switch included in the circuit by the closure of a switch which precedes in operation, a shunt circuit, a maintaining winding in the shunt circuit for the last of said switches, and means including the said last switch contacts for short-circuiting the actuating winding of the preceding switch.

21. In an electric controller, a circuit, a series of switch contacts in the circuit, an actuating winding for each switch included in the circuit by the closure of a switch which precedes in operation, a shunt circuit, a maintaining winding in the shunt circuit for the last of said switches, and contacts on the said last switch for energizing the said maintaining winding and for short-circuiting the operating windings of all the switches.

22. In an electric controller, a circuit, resistance sections therefor, a series of switches adapted to close in a predetermined order to control the resistance sections, operating windings for the switches, a second circuit closed on the actuation of the said last switch, and a winding on the last switch and in the second circuit to maintain the said last switch closed, the said last switch when closed establishing a short circuit around the said actuating windings.

Signed at Cleveland, Ohio, this 22nd day of April, A. D. 1911.

JAY H. HALL.

Witnesses:
R. H. BENNETT,
H. M. DIEMER.